(12) United States Patent
Bhandari et al.

(10) Patent No.: US 6,567,228 B1
(45) Date of Patent: May 20, 2003

(54) OPTIMIZED STAGE READER FOR LOW COST IMPLEMENTATION OF PREAMPLIFIERS

(75) Inventors: Sanjay Manohar Bhandari, Sunnyvale, CA (US); Ramesh Selvaraj, Santa Clara, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 417 days.

(21) Appl. No.: 09/586,465

(22) Filed: Jun. 3, 2000

(51) Int. Cl.[7] .............................. G11B 15/18; G11B 5/09
(52) U.S. Cl. ........................................... 360/67; 360/46
(58) Field of Search ..................... 360/67, 46; 327/489, 327/487

(56) References Cited

U.S. PATENT DOCUMENTS

| | | | |
|---|---|---|---|
| 5,337,025 A | 8/1994 | Polhemus | 333/28 R |
| 5,828,265 A | 10/1998 | Mensink et al. | 327/563 |
| 6,124,819 A * | 6/2000 | Zhou et al. | 341/155 |
| 6,204,980 B1 * | 3/2001 | Momtaz et al. | 360/29 |
| 6,236,524 B1 * | 5/2001 | Gregoire et al. | 360/46 |
| 6,404,578 B1 * | 6/2002 | Bhandari et al. | 360/61 |
| 6,420,910 B1 * | 7/2002 | Contreras et al. | 327/77 |

FOREIGN PATENT DOCUMENTS

| | | |
|---|---|---|
| EP | 0587965 B1 | 4/1999 |
| GB | 2215931 A | 9/1989 |

* cited by examiner

*Primary Examiner*—Regina N. Holder
(74) *Attorney, Agent, or Firm*—Kevin Simons

(57) ABSTRACT

A magnetic head reader circuit comprises a gain stage that is configured to effect multiple functions. In a preferred embodiment, the gain stage is a single stage circuit that includes programmable gain, programmable bandwidth and high-frequency boost, and squelch control. The single stage circuit also includes a folded cascode current drive that provides an increased dynamic range of the gain stage. To provide a low DC offset, the reader also includes an integrator that is operated in closed loop to appropriately attenuate the currents from the cascode current drive. By employing a multi-function single stage reader, a substantial reduction in circuit area, and a substantial increase in bandwidth, is achieved.

15 Claims, 4 Drawing Sheets

OPTIMIZED STAGE READER FOR LOW COST IMPLEMENTATION OF PREAMPLIFIERS

BACKGROUND OF THE INVENTION

1. Field of the Invention

This invention relates to the field of electronic storage devices, and in particular to a preamplifier for transferring information from a magnetic medium via magnetic heads.

2. Description of Related Art

Magnetic recording devices are used to write information to, or read information from, a magnetic medium, such as a floppy disc or a hard disc for storing programs and data in a computer.

The read channel for a magnetic recording device includes a sensor in the form of a magneto-resistive head in close proximity with the magnetic medium. When the magnetic material is moved relative to the sensor, a flux is induced in the sensor in dependence upon the local orientation of the magnetic material, thereby generating an information signal that can be amplified and then decoded.

When information is written in digital form, such as for computer data storage or digital recording of music, a current is generated by a write channel and passed through a thin film head in one direction to write a binary "0" and in the opposite direction to write a "1". When the medium is read by the sensor, or read head, the portions recorded with a binary "0" will induce a current in the head in the one direction and portions recorded with a binary "1" will induce a current in the opposite direction, which is then decoded by a bit detector. Because this invention applies to the processing of signals from the read head of a magnetic disk device, write operations are not discussed further herein.

To achieve high density or high speed, or both, multiple heads are often used. A hard disk drive, for example, typically includes multiple magnetic discs, or platters, each side of which is used for reading and writing information. The read heads and write heads are mounted on movable arms positioned at each side of disk. FIG 1 illustrates an example block diagram of the read signal path of a "preamp" 100 for a disk drive with mulitple read heads 121a–121n. This pre-amp 100 is typically controlled by a microcontroller 50 in the disk drive that processes commands from a higher level system (not shown) for reading, writing, and configuring the disk drive. Each head 121a–n is uniquely addressable by a head selector 110, in combination with a signal (R/W') that indicates whether a read head 121a–n or a write head is being accessed. Typically, the head selector selects one of the heads H based on an address provided by the microcontroller 50 on the address bus 102. Each read head 121a–n has an associated "Reader Front End" (RFE) 120. The RFE 120 contains an amplifier 125 that provides the read signal from the selected read head 121 to a "Reader Back End" (RBE) 130. The RBE 130 further processes the read signal via a reader 140, that includes filters, amplifiers, and the like to reduce noise and other anomalies that are associated with the response of a read head 121 to the magnetic flux on a magnetic medium (not shown) in the vicinity of the read head 121. As illustrated, due to the relatively poor signal to noise ratio that is common in disk drives, differential signaling is used. The buffer 150 provides the differential read signals RDp and RDn to a read/write channel interface device 190 that converts this differential input into a logic value corresponding to the information that is encoded as flux on the magnetic medium in the vicinity of the select read head 121. This logic information is communicated to a microcontroller 50, typically as a collection of logic values forming a byte or word. The communicated information may be, for example, the information bits of a database file, a text or graphics file, an audio or video recording, and so on. Also illustrated in FIG. 1 is an MR bias setting block 160 that is configured to control the amount of bias current that is applied to each read head 121. Bias current is typically provided to magneto-resistive (MR) heads to improve noise immunity and linearity. Also shown in FIG. 1 are control and data signals for writing information to the medium.

FIG. 2 illustrates an example block diagram of a reader back end 130 that illustrates the stages 141–149 that are typically included in a convention reader 140. A conventional reader 140 includes a read multiplexer 141 that segregates the outputs from all of the RFEs 120, and provides some amplification to the differential signal from the selected RFE. Following the read multiplexer 141, the conventional reader 140 provides a bandwidth limiting stage 143, that sets the high frequency pole of the stage 143 based on a bandwidth control input 131. After the read multiplexer and bandwidth control stages, the signal is amplified in a programmable amplifier 145, whose gain is controlled by a gain select input 132. The next stage is a signal suppression stage 147 that suppresses the signal as required during transitions to further optimize the performance of the reader 140. An amplification and high frequency boost stage 149 provides further amplification to the signals, including an increased amplification of high frequency signals, to compensate for poles of the read stages and parasitic effects, as well as to provide the required high frequency bandwidth. Other gain control capabilities, common in the art, are provided to further optimize the performance of the reader back end 130. For example, in a conventional reader 140, a squelch control input 133 attenuates the signal during transitions, such as when a new head is selected, including switching from write heads to read heads. Note that the particular ordering of stages 141–149 is presented for illustrative purposes only, different systems may provide a different ordering of processing, as well as additional or fewer stages as required to achieve a given performance level.

As is known in the art, the various stages in the reader 140 each provide a desired feature and advantage, but at the cost of circuit area and performance. Each stage includes characteristic poles and the combined filter effect of this variety of poles limits the bandwidth of the reader 140. Each stage also typically includes an input component, a transform component, and an output component, each stage's input component being based on the prior stage's output component. The transform component effects the desired function of each stage. As the demand for low-cost computer systems continues to increase, the design requirements for hard disk drives, and other magnetic storage devices, are particularly cost-sensitive.

BRIEF SUMMARY OF THE INVENTION

It is an object of this invention to provide a low cost preamplifier for reading data that is contained on a magnetic medium, via a read head. It is a further object of this invention to provide a low-cost preamplifier that is programmable. It is a further object of this invention to provide a low-cost preamplifier that has a high bandwidth. It is further object of this invention to provide a low-cost preamplifier that has a very low write-to-read settling time. It is a further object of this invention to provide a low-cost amplifier that suppresses reader output during transitions.

These objects and others are achieved by providing a reader with a gain stage that is configured to effect multiple functions. In a preferred embodiment, the gain stage is a single stage circuit that includes programmable gain, programmable bandwidth and high-frequency boost, and squelch control. The single stage circuit also includes a folded cascode current drive that provides an increased dynamic range of the gain stage. To provide a low DC offset, the reader also includes an integrator that is operated in closed loop to appropriately attenuate the currents from the cascode current drive. By employing a multi-function single stage reader, a substantial reduction in circuit area, and a substantial increase in bandwidth, is achieved.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
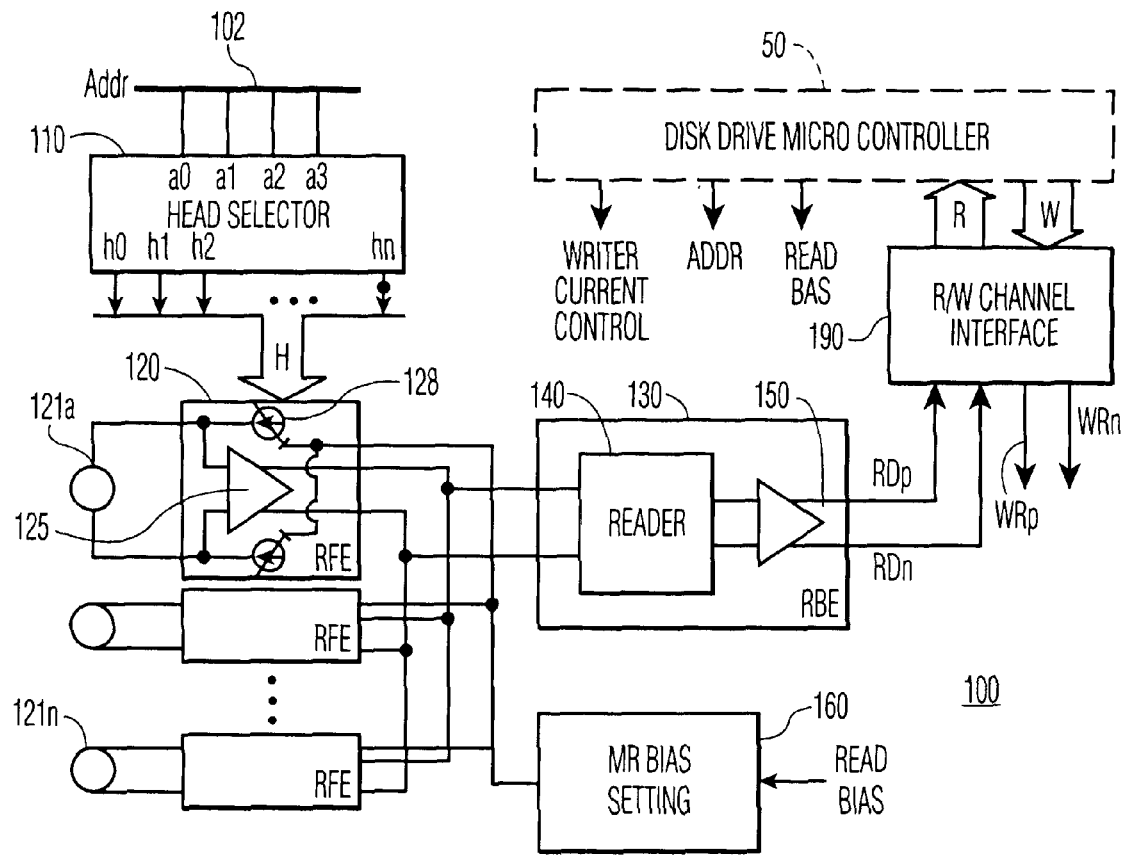
FIG. 1 illustrates an example block diagram of a read system of a prior art disk drive.
Figure 2:
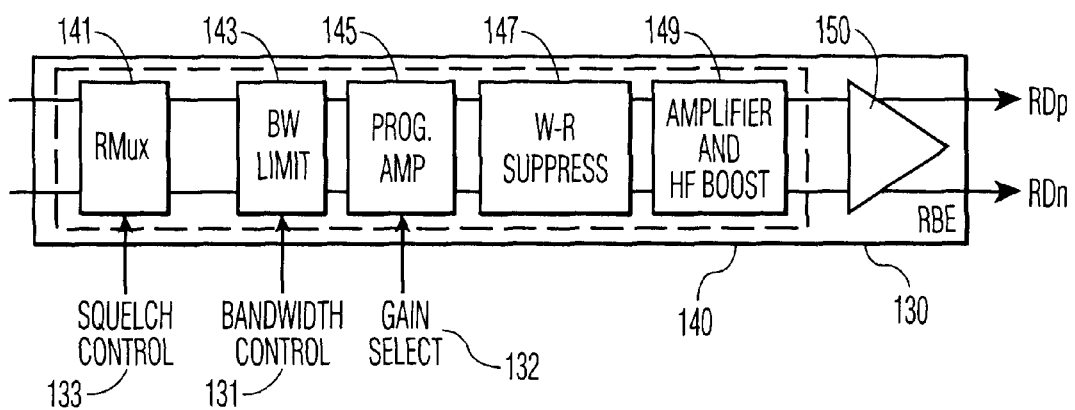
FIG. 2 illustrates an example block diagram of a reader back end of a prior art disk drive.
Figure 3:
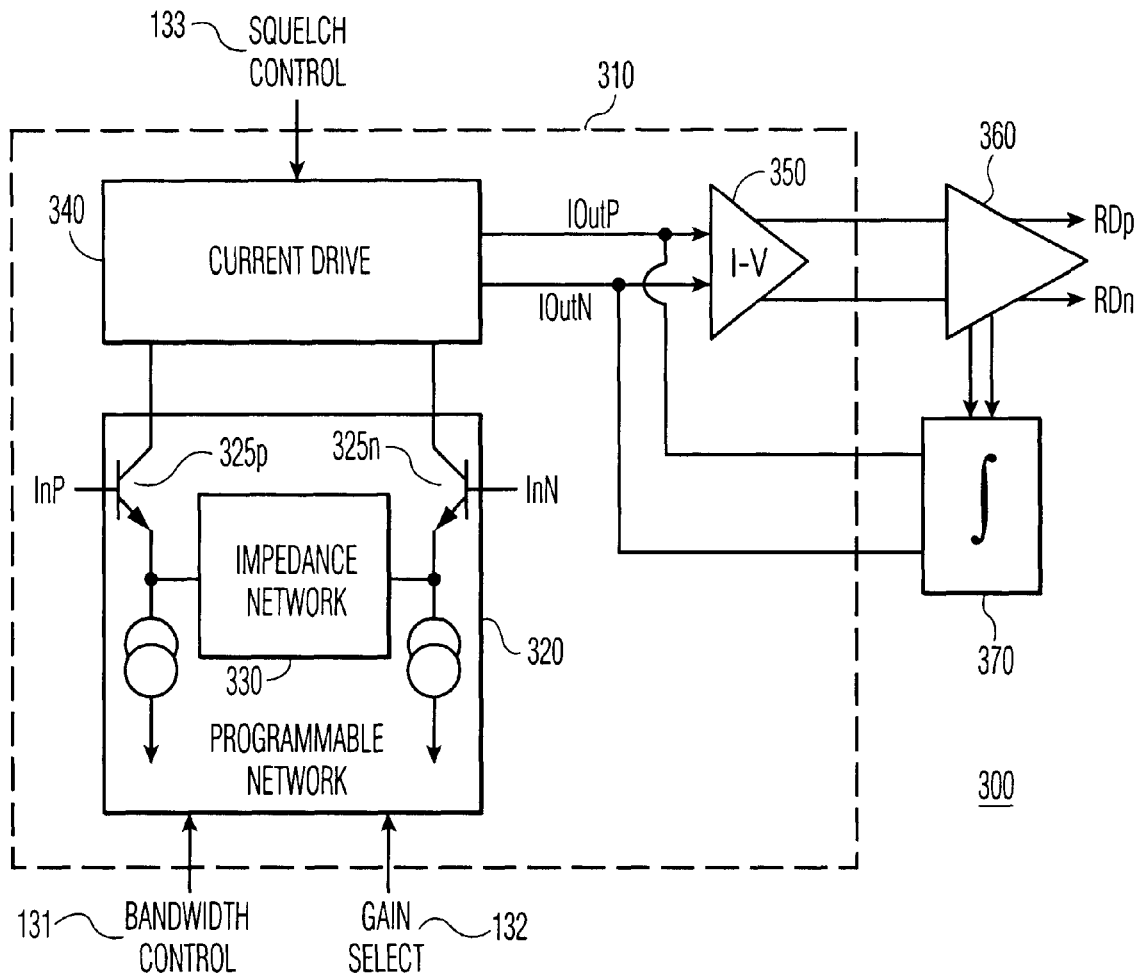
FIG. 3 illustrates an example block diagram of a reader back end in accordance with this invention.

FIG. 3 illustrates an example block diagram of a reader back end 300 in accordance with this invention. The reader back end 300 is a two stage circuit that includes a gain stage 310 and a buffer stage 360. The gain stage 310 includes a programmable network 320, a current drive 340, and a current-to-voltage converter 350. The programmable network 320 receives a differential input InP and InN from a read head, via a select read front end (120 in FIG. 1), and draws current from the current drive 340 that is dependent upon the differential input and an impedance network 330 within the programmable network 320. The current drive 340 provides a differential current output IOutP, IOutN that is based on the current drawn by the programmable network 320. This differential current output IOutP, lOutN is converted to a differential voltage by the current-to-voltage converter 350, and the differential voltage is provided to the buffer 360. The buffer 360 provides a buffered differential output RDp and RDn to a read/write channel interface device (190 in FIG. 1) that converts this differential input into a logic value corresponding to the information that is encoded as flux on the magnetic medium in the vicinity of the select read head.

As illustrated in FIG. 3, the programmable network 320 is controlled by a bandwidth control input 131 and a gain select input 132. The combination of bandwidth control input 131 and gain select input 132 determines the impedance value of the impedance network 330. The gain select input 132 determines a resistance value between the two emitter follower circuits 320p, 320n, and thereby determines the gain of gain stage 310. The bandwidth control input 131 determines a capacitance value between the two emitter follower circuits 325p, 325n, and thereby determines the location of the high frequency pole of the gain stage 310. Note that, as compared to a multi-stage reader, the single stage reader 300 has significantly fewer poles.

Figure 4:
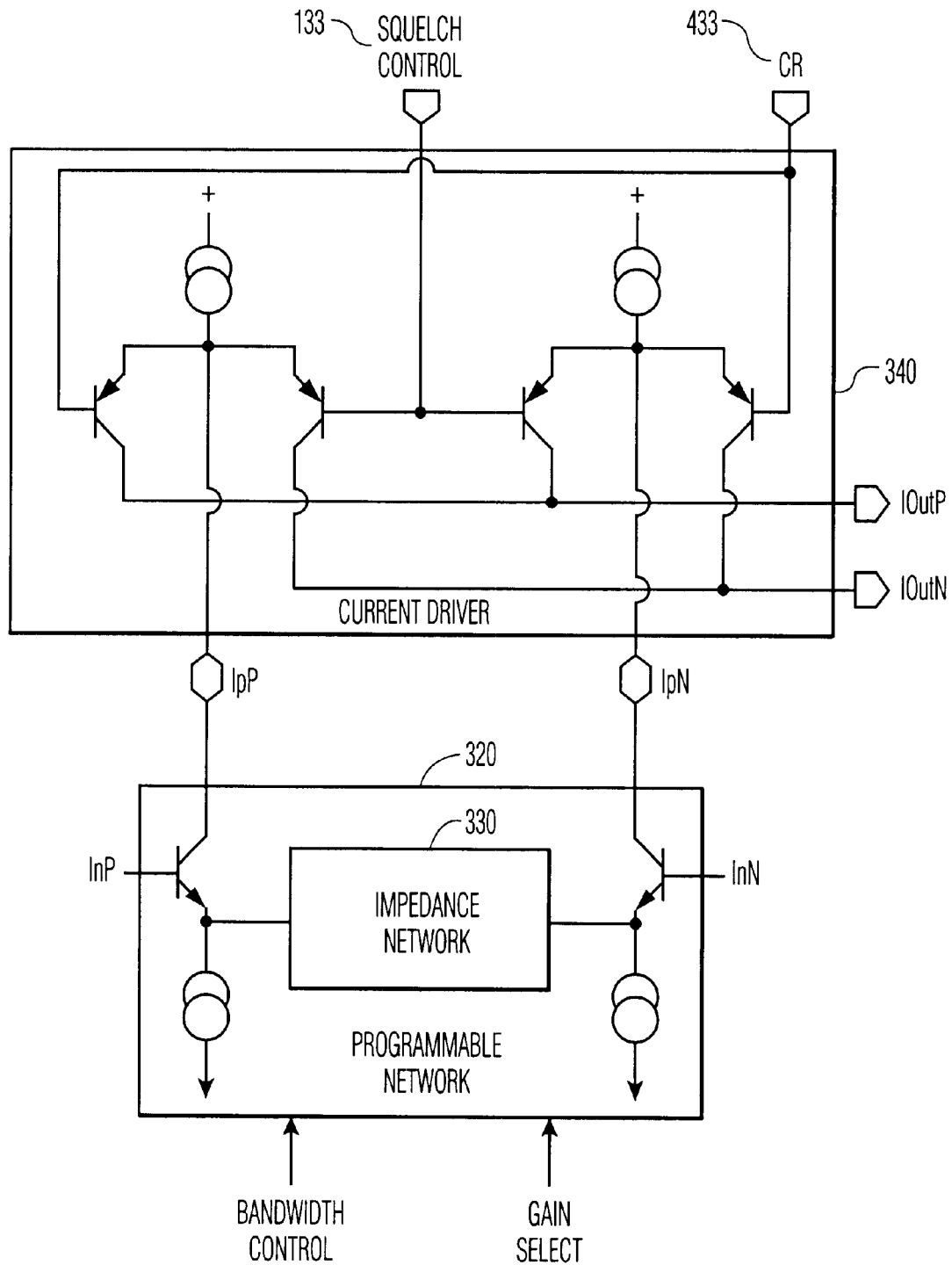
FIG. 4 illustrates an example block diagram of a cascode current drive for a magnetic head reader in accordance with this invention.

The current drive 340 operates as a current amplifier, the differential current output IOutP, IOutN being dependent upon the differential current drawn by the programmable network. In a preferred embodiment, the current drive 340 is configured as a folded cascode current drive, as illustrated in FIG. 4. The Cr input 433 controls the output current flow by maintaining an appropriate voltage bias. When the squelch control input 133 is asserted, such as during head selection transitions, the cross-configuration of the current driver 340 effectively reduces the differential signal current output IOutP–IOutN to zero. Note that the use of a folded cascode configuration in the current driver 340 provides a higher dynamic range for the gain stage 310 than a conventional current amplifier.

Figure 5:
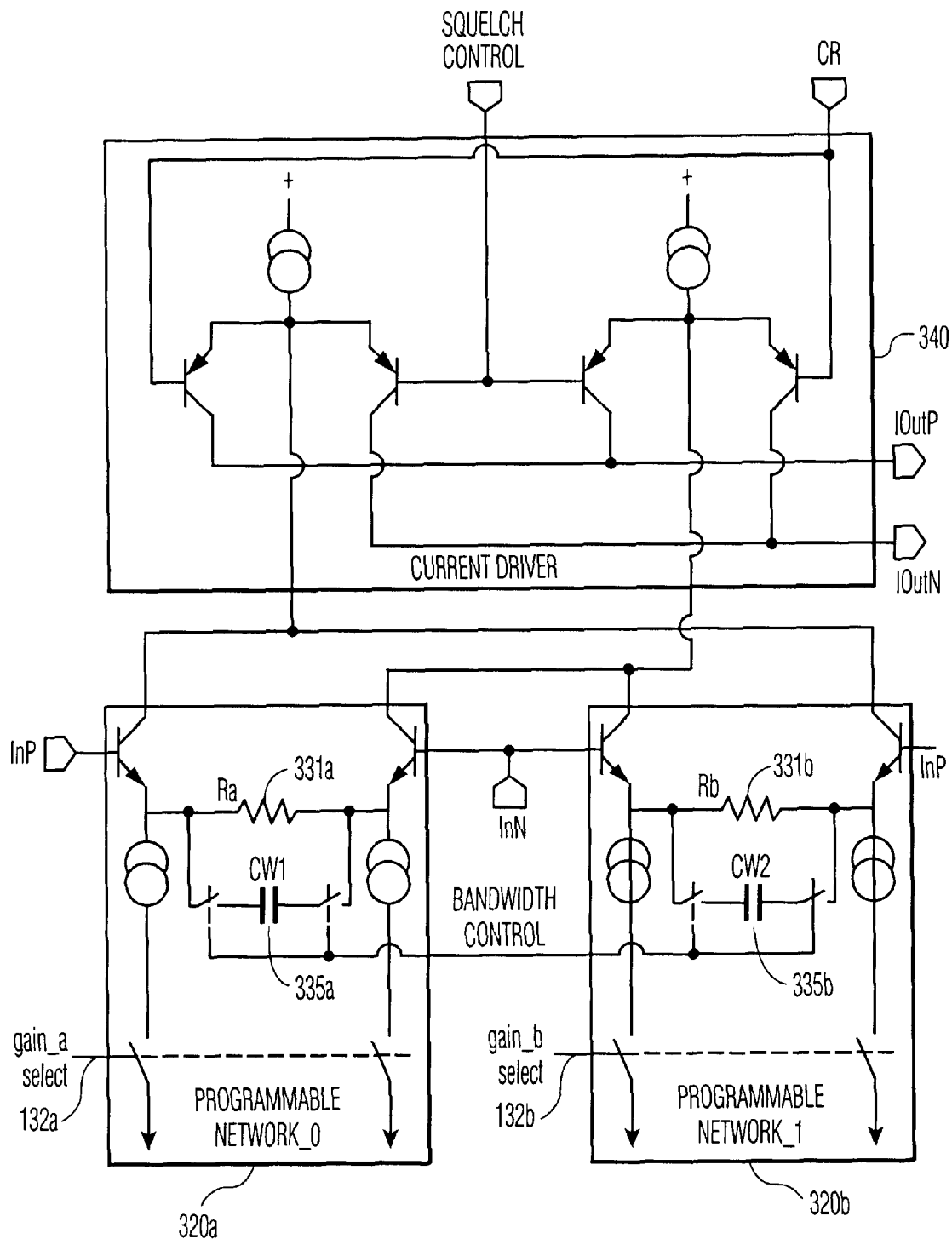
FIG. 5 illustrates an example block diagram of a programmable network for a magnetic head reader in accordance with this invention.

The programmable network 320 includes an impedance network 330 between emitter follower circuit configurations 325a, 325b that determines the gain and bandwidth of the gain stage 310. The impedance value of this impedance network 330 can be directly controlled by the bandwidth control 131 and the gain select input 132, using, for example, switches that couple and de-couple components within the network 330. In a preferred embodiment, the programmable network 320 includes multiple networks that are selectively enabled, as illustrated in FIG. 5. Two networks 320a, 320b are illustrated in FIG. 5, although, as will be evident to one of ordinary skill in the art, additional networks may be embodied, for additional gain control. Each of the networks 320a, 320b contains a different resistor value Ra 331a, Rb 331b between the emitter nodes of the emitter follower configurations 325a, 32b. The different resistor values 331a, 331b effect a different current flow into the corresponding programmable network 320a, 320b in response to the inputs InP, InN from the magnetic heads, thereby producing different magnitudes of differential output current IOutP, IOutN. As illustrated, the gain_a select input 132a enables network 320a, while the gain_b select input 132b enables network 320b, thereby effecting the different gains provided by resistors Ra 331a and Rb 331b.

Each of the programmable networks 320a, 320b include a capacitor, CW1 335a, CW2 335b respectively, that is either switched into or out of the network between the emitters of the emitter followers 325a, 325b, based on the state of the bandwidth control input 131. The presence or absence of the capacitors 335a, 335b in the network 320 determines the location of the high frequency pole of the gain stage 310. In a conventional reader, the parasitic capacitance of the switches used to decouple capacitors from a high bandwidth preamplifier has the effect of reducing the bandwidth. Because the capacitor switching occurs in the emitter circuit in the networks 320a, 320b of FIG. 5, such a degradation in bandwidth is prevented.

Returning to FIG. 3, the reader 300 also includes an integrator 370 that is configured in a closed loop to control the DC offset voltage in a preferred embodiment. In a preferred embodiment, the integrator 370 receives a differential signal from the buffer 360 that is based on the differential voltage output of the gain stage 310. The integrator 370 provides an averaging function, and the average of the differential output voltages is used in the reader 300 as a measure of the DC offset voltage on the output voltages. The integrator 370 feeds back current to reduce the magnitude of the differential output currents IOutP, IOutN in dependence upon the average values of the differential voltage output of the gain stage 310. The closed loop integration loop also provides an effective signal suppression during the aforementioned transitions from write heads to read heads, embodying the principles presented in copending application "CIRCUIT FOR REDUCTION AND OPTIMIZATION OF WRITE-TO-READ SETTLING TIMES IN MAGNETIC MEDIUM STORAGE DEVICES", U.S. Ser. No. 09/407,776, filed Sep. 28, 1999 for Sanjay Bhandari and David Allouche, which is incorporated by reference herein.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

We claim:

1. A preamplifier for processing signals from a magnetic head of a storage device comprising:

a gain stage, operably coupled to the magnetic head, that is configured to receive the signals from the magnetic head, and provide a filtered amplified output based on the signals from the magnetic head; and a buffer stage, operably coupled to the gain stage, that is configured to receive the filtered amplified output, and provide a buffered output based on the filtered amplified output;

wherein the gain stage is a single stage device comprising a pair of emitter follower circuits and a prograrnrnable impedance network coupled between the emitter nodes of the emitter follower circuits such that the gain stage is also configured to receive a gain select input and a bandwidth control input, and adjust the impedance value of the programmable impedance network to provide the filtered amplified output having gain that is based on die gain select input, and a high frequency pole that is based on the bandwidth control input.

2. The preamplifier of claim 1, wherein the single stage device is also configured to receive a squelch control input, and further provides the filtered amplified output having a reduced amplitude based on the squelch control input.

3. The preamplifier of claim 2, wherein the single stage device further provides the filtered amplified output having an increased gain at high frequencies of the signals from the magnetic head.

4. The preamplifier of claim 1, wherein the buffer stage provides the buffered output having a DC offset that is less than 100 millivolts.

5. The preamplifier of claim 1, further including:

an integrator, operably coupled to the buffer stage and to the gain stage, that is configured to:

integrate the filtered amplified output to produce an integration output, and reduce the amplitude of the filtered amplified output based on the integration output, thereby minimizing the DC offset of the buffered output.

6. The preamplifier of claim 1, wherein the single stage device includes two gain stage devices that are operated in a folded cascode configuration, thereby increasing the dynamic range of the gain stage.

7. A preamplifier for processing signals from a magnetic head of a storage device comprising:

a gain stage, operably coupled to the magnetic head, that is configured to receive the signals from the magnetic head, and provide a filtered amplified output based on the signals from the magnetic head; and a buffer stage, operably coupled to the gain stage, that is configured to receive the filtered amplified output, and provide a buffered output based on the filtered amplified output;

wherein the signals from the magnetic head comprise a differential signal pair, and the gain stage includes:

a programmable network that is configured to provide a selection of components based on a gain select input and a bandwidth control input, the selection of components forming:

a pair of emitter follower circuits, a base input of each emitter follower of the pair of emitter follower circuits being connected to a corresponding signal of the differential signal pair, and an emitter output of each emitter follower being connected to opposite ends of an impedance network, and a collector of each emitter follower being connected to an output device that provides a differential output current in dependence upon the differential signal pair and an impedance of the programmable network, the programmable network including:

a resistor having a resistance based on the gain select input, and a capacitor having a capacitance based on the bandwidth control input; and a current-to-voltage converter that provides the filtered amplified output based on the differential output current.

8. The preamplifier of claim 7, wherein the output device is configured as a folded cascode circuit that provides an increased dynamic range of the gain stage.

9. The preamplifier of claim 7, wherein the output device is configured to reduce the differential output current in further dependence upon a squelch control input.

10. The preamplifier of claim 7, further including:

an integrator, operably coupled to the buffer stage and to the gain stage, that is configured to reduce the differential output current in dependence upon the filtered amplified output, thereby reducing the DC offset of the buffered output.

11. A disk drive comprising:

at least one read head that is configured to detect magnetic flux from a medium in proximity to the read head;

a read-front-end, operably coupled to the read head, that provides an input signal corresponding to the detected magnetic flux;

a gain stage, operably coupled to the read-front-end, that is configured to receive the input signal, and provide a filtered output based on the input signal, a buffer stage, operably coupled to the gain stage, that is configured to receive the filtered output, and provide a buffered output based on the filtered amplified output; and a channel interface, operably coupled to the buffer stage, that is configured to provide information bits corresponding to the detected magnetic flux on the medium, based on the buffered output;

wherein the gain stage is a single gain stage device comprising a pair of emitter follower circuits and a programmable impedance network coupled between the emitter nodes of the emitter follower circuits such that the gain stage is also configured to receive a gain select input and a bandwidth control input, and adjust the impedance value of the programmable impedance network to provide the filtered amplified output having a gain that is based on the gain select input, and a high frequency pole that is based On the bandwidth control input.

12. The disk drive of claim 11, wherein the single stage device is also configured to receive a squelch control input, and further provides the filtered amplified output having a reduced amplitude based on the squelch control input.

13. The disk drive of claim 12, wherein the single stage device further provides the filtered amplified output having an increased gain at high frequencies of the signals from the magnetic head.

14. The disk drive of claim 11, wherein the buffer stage provides the buffered output having a DC offset that is less than 100 millivolts.

15. The disk drive of claim 11, further including:

an integrator, operably coupled to the buffer stage and to the gain stage, that is configured to:

integrate the filtered amplified output to produce an integration output, and reduce the amplitude of the filtered amplified output based on the integration output, thereby minimizing the DC offset of the buffered output.

* * * * *

Disclaimer 6,567,228— Sanjay Manohar Bhandari, Sunnyvale, CA (US); Ramesh Selveraj, Santa Clara, CA (US). OPTIMIZED STAGE READER FOR LOW COST IMPLEMETATION OF PREAMPLIFIERS. Patent dated May 20, 2003. Disclaimer filed March 28, 2008, by the assignee, Koninklijke Philips Electronics N.V.

Hereby enters this disclaimer to all claims of said patent.

(*Official Gazette October 7, 2008*)